Sept. 4, 1951  A. H. BATES  2,566,304
METHOD OF AND MACHINE FOR MAKING PISTON RINGS
Filed Oct. 15, 1943  2 Sheets-Sheet 1
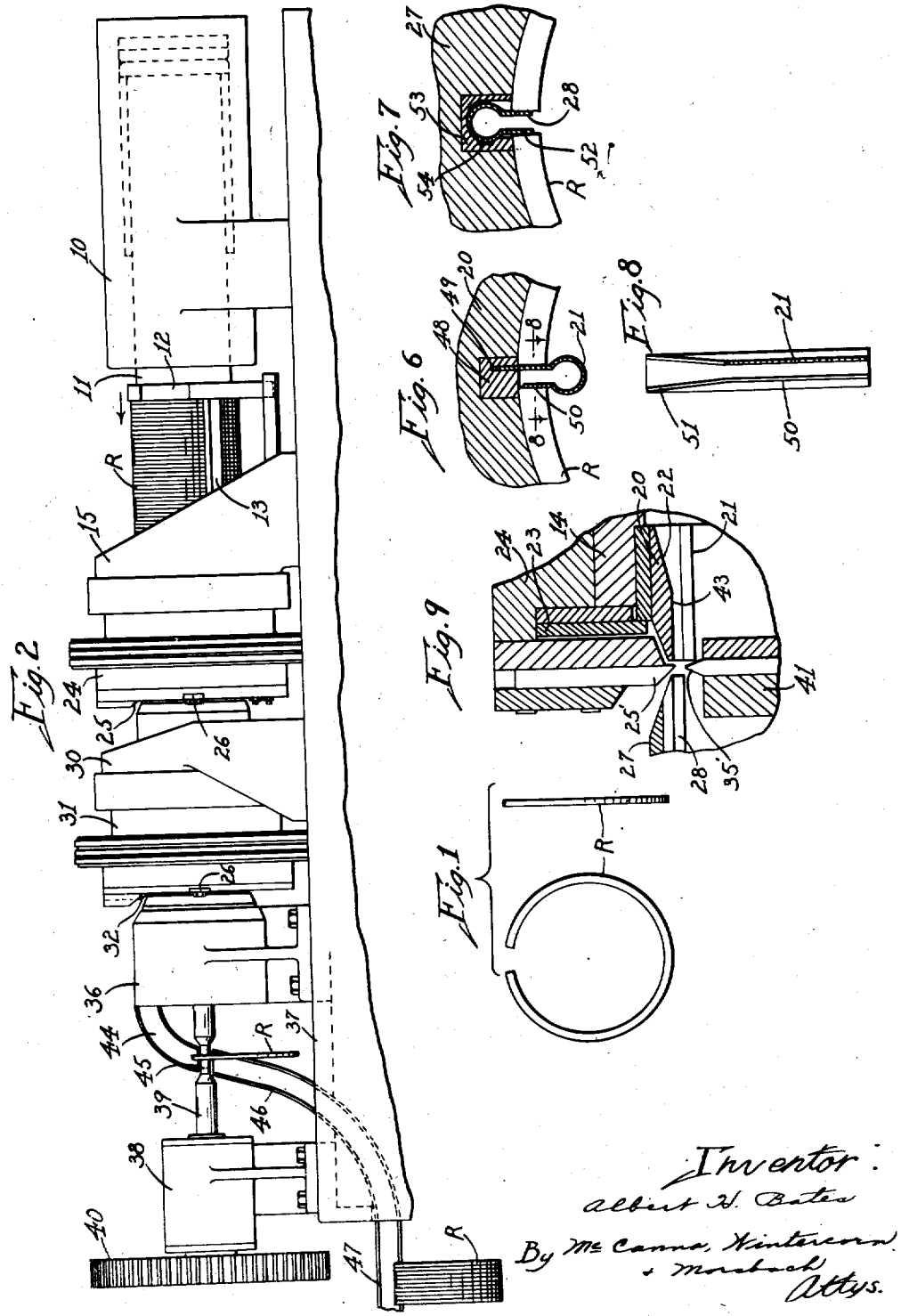

Sept. 4, 1951 A. H. BATES 2,566,304
METHOD OF AND MACHINE FOR MAKING PISTON RINGS
Filed Oct. 15, 1943 2 Sheets-Sheet 2
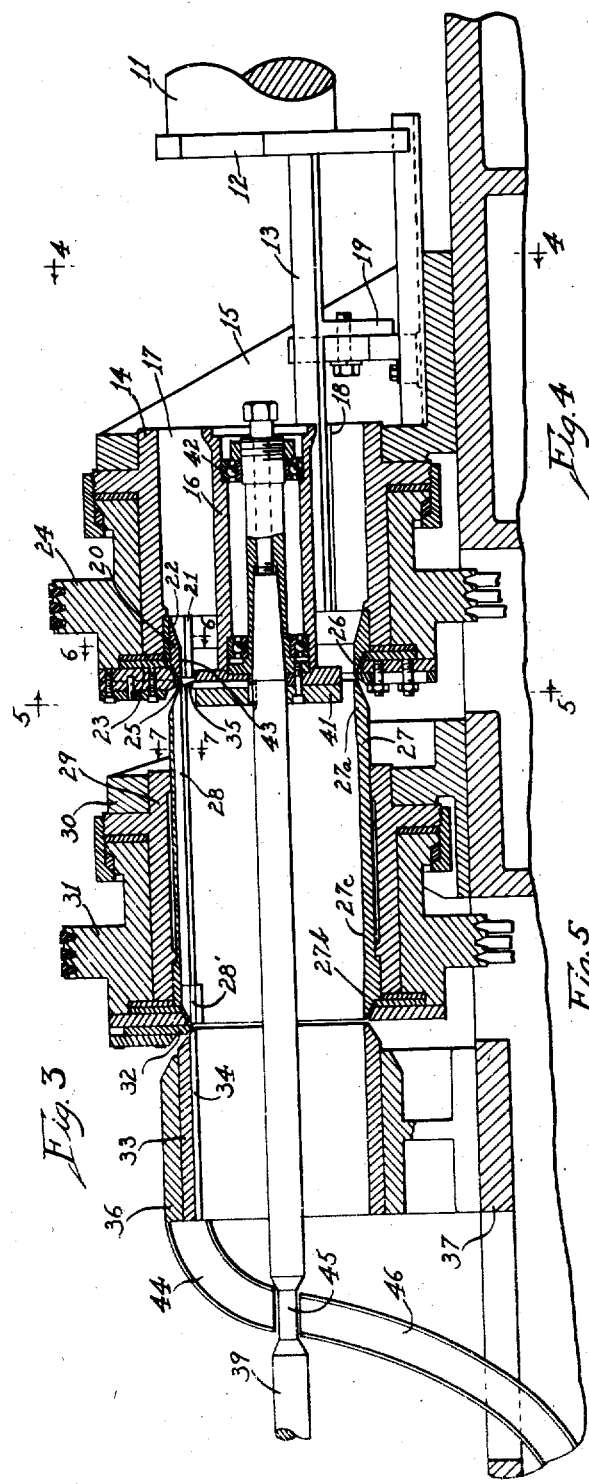
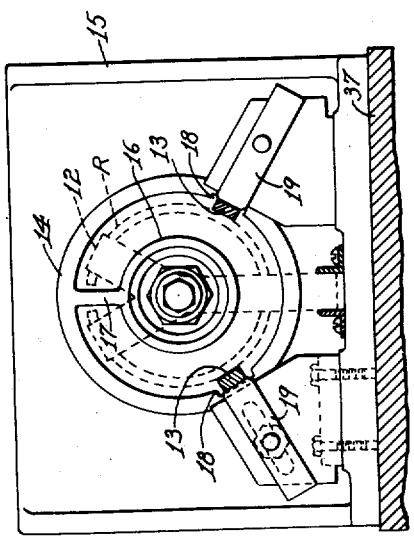
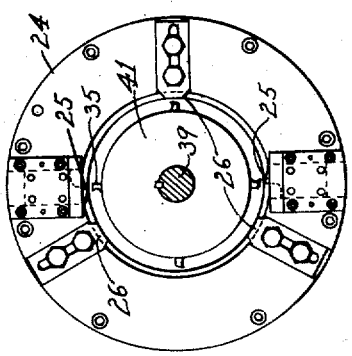
Inventor:
Albert H. Bates
By McCanna, Wintercorn
& Morshach
Attys.

Patented Sept. 4, 1951

2,566,304

UNITED STATES PATENT OFFICE 2,566,304

METHOD OF AND MACHINE FOR MAKING PISTON RINGS

Albert H. Bates, Rockford, Ill., assignor to Burd Piston Ring Company, Rockford, Ill., a corporation of Illinois Application October 15, 1943, Serial No. 506,342

15 Claims. (Cl. 29—27)

The present invention relates to a new and useful method for making piston rings and a machine particularly suited to turn these rings on the outer periphery and finish them on the inner periphery, in sequence or at the same time.

In general, piston rings for automotive engines are cast or formed out of round, as disclosed by many patents. The ring is side ground to produce true, flat, smooth, and parallel surfaces on both sides. A gap is then cut or formed, leaving the ring in the form of an open resilient spring, illustrated in Fig. 1. The rings are then stacked in rows in various kinds of closing fixtures, which close the gap until the rings are approximately circular. They are then clamped endwise on an arbor with suitable collars, all as disclosed by the prior art. The rings are then turned or ground on a lathe or similar device to the required outside finish, smoothness and diameter. Sometimes the rings are rough turned, as described, and then released from the clamping collars and arbor, and again closed and clamped a second time and finished turned or ground to produce a truer smoother finish on the outside diameter. After release from the clamping device, the rings are generally again closed and placed inside a sleeve or boring fixture and clamped axially while they are rough and finish bored. In other words, the sequence of turning and boring operations described is, after side grinding:

1. Close and clamp on arbor;
2. Rough turn;
3. Release from arbor;
4. Close and clamp on arbor;
5. Finish turn;
6. Release from arbor;
7. Place in closing device;
8. Rough bore; and
9. Finish bore.

This sequence may be varied to suit requirements; for instance, rough turn, rough bore, finish bore, finish turn.

In these turning and boring operations, it is apparent that the labor of handling closing and clamping fixtures and putting the fixtures into turning and boring machines is a large part of the work required to complete the turning and boring operations.

In accordance with the method of my invention, the turning and boring of piston rings is accomplished without the need for any mechanically operated closing devices, arbors, collars, etcetera, as described above, the turning and boring being accomplished at the same time or in sequence in one operation. In other words, with my new method, only the rings are placed in the machine. They are closed, turned, bored and released all within the machine and without the necessity of their being handled even once in any intermediate stage of the process.

The invention is illustrated in the accompanying drawings, in which:

Fig. 1 is a face view and edge view of a piston ring such as the machine of my invention is adapted to operate upon;

Fig. 2 is a side elevation of the machine of my invention;

Fig. 3 is a longitudinal section of the main portions of the machine, on a larger scale;

Figs. 4 to 7 are sections on the correspondingly numbered lines of Fig. 3;

Fig. 8 is a longitudinal section of the spring blade shown in Fig. 6, showing the widening of the end portion at the point where the outside turning is commenced, and Fig. 9 is a fragmentary sectional view corresponding to a portion of Fig. 3 but showing a different relationship of the turning and boring tools for turning and boring at the same time, instead of in sequence.

Similar reference numerals are applied to corresponding parts in these views.

Referring to Figs. 2 and 3, mainly, the reference numeral 10 designates a hydraulic cylinder with piston and piston rod 11 and pusher 12 mounted on end of piston rod. This hydraulic mechanism is actuated by a commercial high pressure hydraulic pump and is regulated by commercial hydraulic controls to perform the following cycle: Starting from rest with piston rod within the cylinder, a foot or hand trip starts the quick approach, followed by a controlled feed to any desired stroke; at the end of the stroke, the pusher trips a lever and the pusher returns automatically to its starting point and is ready for a new cycle, when a new load of rings is placed on adjustable guides 13.

The controls for these operations are commercial devices which need not be shown because they are so well known, being of a kind used almost universally in the machine tool industry.

14 is a hollow cylindrical casting mounted on bracket 15. This annular casting has a hollow bearing hub 16 throughout its length supported solely by rib 17. Notches 18 are provided to make space through the length of the cylinder 14 for the adjustable guide bars 13. The latter have adjusting brackets 19 to permit radial adjustment of the guides relative to the cylinder 14 to suit different sizes of rings being operated upon. At its discharge end the cylinder 14 carries a main external chuck in the form of an annular tapered sizing ring 20. This ring is smoothly and accurately finished and highly polished, and its smallest inside diameter is sized closely to suit ring size being handled.

Sizing ring 20 carries a spring 21 of blade or double blade form, which when split rings are pushed through the cylinder 14 with their gaps slipping over the rib 17 and nearly closed, after passing hollow conical taper 22 in the sizing ring 20, serves to generate a substantial expanding pressure on the adjacent ends of the ring at the gap. This expanding pressure makes the split ring conform closely to the bore of the sizing ring 20 and also prevents rotary motion of ring caused by the turning being done on the outside. 23 is a retaining ring which keeps the sizing ring 20 in place. The cylinder 14 also carries on its periphery a driving head 24 that is given rotary motion by any suitable driving means. I have indicated a V-belt drive, but could use almost any controlled steady drive of required capacity and R. P. M.

Head 24 carries a turning tool or tools 25, preferably a plural number, also a plural number of steady rests 26 that bear on the periphery of the rings at circumferentially spaced points, as shown in Fig. 5, to help keep the same central while they are being turned and bored, while passing from the sizing ring 20 to the auxiliary external chuck in the form of a sleeve 27. 27 is a hollow annular sleeve of an inside diameter at its ends to suit a rough turned ring. Sleeve 27 is smaller in inside diameter at its ends 27a and 27b than the sizing ring 20, and has a blade or blades 28 throughout its length. The intermediate portion 27c of the bore of the sleeve 27 is enlarged so that there is less frictional drag on the operation of the machine and still just as much ultimate accuracy in its production. The sleeve 27 is as closely placed axially to the sizing ring 20 as is possible to clear the turning tools 25 and steady rests 26. For instance, when turning rings $\frac{7}{16}$" wide, the space axially from 27 to 20 might be about $\frac{3}{32}$". The sleeve 27 is supported by an annular or hollow cylindrical casting 29, which is very similar to the cylinder 14 but which does not have hollow hub 16 or rib 17. The cylinder 29 is supported by a bracket 30, which may be identical to bracket 15. The head 31 revolves about the cylinder 29 and may be identical to the head 24, and be driven likewise. The head 31 carries turning tools 32 and also steady rests 26, which may be identical with the tools 25 and steady rests 26, but these tools and rests are sharpened and set for a finishing cut.

33 is an annular sleeve of a size internally suited to the outside diameter of finish turned ring and is located axially as close to the sleeve 27 as possible, and carries a guide blade 34 extending lengthwise of the inside thereof to fit slidably in the ring gaps and keep these gaps aligned with the guide 44. The blade 34 may be of either of the two types 21 and 28 if an expanding pressure is desired, but will otherwise be a fixed blade of approximately the width of the web portion of the I-section guide 44. Sleeve 33 is demountably supported in a bracket 36, which, in turn, is anchored to the base 37.

The blade 28 is constructed, as shown in Fig. 7, to give an expanding or spreading pressure on the opposite ends of the ring at the gap, such expanding pressure being desirable where the sleeve 27 holds the rings while they are being bored by the boring tool or tools 35 and especially where the rings are turned and bored at the same time, as illustrated in Fig. 9. The short length blade 28' at the outgoing end of the sleeve 27 is similar to the blade 21, shown in Fig. 6, and is preferably flared like that blade, as indicated in Fig. 8, a change-over from a blade of the externally projecting type 28 to the internally projecting type 21 being necessary at the outgoing end of the sleeve 27 because of the fact that the rings are given their finish turning at that point by the tool or tools 32.

38 is a bearing bracket rotatably supporting a drive shaft 39, and 40 is a drive gear or other means for transmitting rotative force or torque through the shaft 39 to the boring head 41 and single or multiple cutting tools 35. The inner end of shaft 39 is suitably supported in bearings 42 in the hub 16, so as to be in true concentricity with respect to the cylinder 14 and sizing ring 20.

The operation of the machine is as follows: Split rings are grouped in cylindrical stacks, say six to twelve inches long, and placed on adjustable guides 13 in front of pusher 12 on piston rod 11. Gaps in the rings are in line with rib 17. The operator trips a starting lever and pusher 12 advances giving a controlled feed. The first load of rings will advance into the cylinder 14 with ring gaps fitting over rib 17. The second or succeeding loads push first load into the sizing ring 20. As the rings advance through the small cylindrical portion 43 of the ring 20, they are presented to turning tools 25, and each tool 25 cuts a successively deeper cut. As ring is turned, it is supported by steady rests 26 and advances into sleeve 27. When a ring has entered the sleeve 27, or is entering, boring tools 35 in boring head 41 bore the inside and the ring advances through sleeve 27 to the other end of the sleeve, where finish turning tools 32 finish turn the outside diameter. The ring at this point is supported again by steady rests, like those at 26, and advances into sleeve 33. Traveling through the sleeve 33, the rings drop out of the far end, and their gaps are slipped over and into an I-section guide 44, which delivers the rings with their gaps properly presented at 45, where the shaft 39 is reduced in diameter to less than the width of the ring gap for easy passage of the ring past the shaft. The ring is then guided along the lower I-section guide 46 through the base 37 of the machine to the outside of the machine, where it may be removed, the finished rings collecting in a group on the substantially horizontal delivery end portion 47 of the guide 46, as indicated in Fig. 1. At the outset, the first few groups of rings fed through the machine will be dummy rings that are finished rings and, hence, are smaller in outside diameter and larger in inside diameter than the rough ring blanks to be machined. These dummy rings will pass through the sizing ring 20 and past the turning tools 25 and boring tools 35 without being machined thereby, and will pass through the sleeve 27, and from the sleeve 27 past the turning tools 32 into the sleeve 33 without being machined. Then, when the machine is filled with dummy rings clear to the outgoing end of the sleeve 33, the first group of rough ring blanks to be machined will be placed on the guides 13 in front of the pusher 12 for passage through the machine. In that way the rings to be machined are assured of proper support in the turning and boring operations, the dummy rings ahead of the rings being machined affording the required head resistance to movement of the long continuous column of rings to maintain the rings being machined under uniform pressure axially to prevent displacement and insure the desired accuracy in production.

The machine may be either horizontal, or vertical, or in an inclined position. When vertically disposed or inclined, the chips will ordinarily drop down freely enough by gravity, so that no special precautions are required to exhaust the chips or dust and accordingly insure smooth machining, but where the machine is operated horizontally, strong suction exhaust means is provided at both ends of the machine to clear away the chips and dust quickly and thus keep the machine operating smoothly.

In Fig. 9, the tools 25' and 35' are disposed so that the turning and boring operations are done at the same time instead of in sequence. Such disposition of the tools is entirely practical and feasible in operating on thicker rings, in which case the ring is still in engagement with blade 21 when it threads onto blade 28. The boring commences in such cases before the turning is completed. Where boring and turning are done at the same time, the boring head will be turned in the opposite direction relative to the turning tool or tools 25, to balance the opposing torque reactions on the rings due to machining the outer and inner peripheries at the same time.

The sections Figs. 6 and 7 show the blades 21 and 28 on a larger scale. Referring to Fig. 6, 48 is a soft metal insert to which the end 49 of one leg of the U-shaped blade 21 is suitably attached, as by brazing. The other leg 50 is therefore free to move to the left, away from the fixed leg, to exert spring pressure to expand the ring R accurately to the inside diameter of the sizing ring 20. The blade 21, as shown in Fig. 8, has the legs substantially parallel throughout the major portion of the length thereof, but at the outgoing end the legs are spread apart, as indicated at 51, to increase the expanding pressure just prior to and during the time that the ring undergoes the turning operation, at which time it is, of course, most important from the standpoint of accuracy in size that the ring be conformed most accurately to the inside diameter of the sizing ring 20. The bore 43 of the sizing ring 20 is preferably a few thousandths of an inch larger in diameter up to the outgoing end portion thereof, so that there will be less frictional drag on the operation of the machine and still just as much accuracy in its production, only the outgoing end portion of the bore 43 being of the size of ring desired. In other words, the ring is contracted slightly as it passes through the outgoing end portion of the bore 43 and at the same time the blade 21 exerts an increased expanding pressure, with a view to obtaining closer accuracy in the turning operation. While I have shown in Fig. 8 a single continuous blade 21 of uniform expander width throughout the major portion of its length and flared for increased expander action at the outgoing end, it should, of course, be understood that I may provide a separate blade section of flared form to take the place of the end portion 51. Without the expander means the rings when finished are found to vary in size often as much as .010" or even more. The percentage of rejection on account of size is negligible with this simple expedient. There is no difficulty in threading the rings over the blade 21 inasmuch as it extends into the flared end 22 of the sizing ring 20 and the gap in the rings is, therefore, of ample width at the point where the ring first encounters the blade. The gaps are, of course, kept in line with the blade 21 by the rib 17.

The spring blade 28, as clearly appears in Fig. 7, is the reverse of the inwardly projecting type 21; it is U-shaped and has the arms extending substantially radially inwardly relative to the piston ring R, so that the two end portions have sliding engagement in the ring gap and serve to expand the ring to the full inside diameter of the sleeve 27. This externally projecting type permits operating on the inner diameter with the tool or tools 25 without any interference with the blade. An insert 53 of soft metal has one side of the middle or C-bend portion of the spring blade suitably fastened thereto, as by brazing, indicated at 54. The blades 21, 28, and 28' are all fastened so that the torsional reaction due to machining on the outer and inner peripheries is assumed by the freely movable and yieldable legs of these blades, as, for example, the left leg in Fig. 6 and the right leg in Fig. 7, whereby to take full advantage of the resilience of the spring blades in absorbing the shocks and so that there will be less danger of the blades being broken or breaking free from their supports.

It will be evident that although I have described a machine in which both turning and boring are done, the same principle of operation might be applied in a machine for only turning or only boring. For example, by merely eliminating the boring head 41, shaft 39, and bearing hub 16 provided for said shaft, the machine is still adapted for the rough turning and finish turning of rings.

It is believed the foregoing description conveys a good understanding of the objects and advantages of my invention. The appended claims have been drawn to cover all legitimate modifications and adaptations.

I claim:

1. In the manufacture of piston rings, or the like, a plurality of coaxially aligned supports, each support having a bore therein adapted slidably to receive a plurality of piston rings in stacked relation face to face in the bore, whereby each ring is held properly positioned normal to an axis of operation by tight contact of its opposed faces with neighboring rings in the stack and is held against displacement radially by contact with the bore, said supports having adjoining ends spaced less than the width of a ring and enough to permit machining the peripheries of the rings in the bores, means for moving the stack axially at a feed rate through the bores past a plurality of tool stations at the aforesaid spaces between supports, and tools at said stations for machining the outer peripheries of said rings in the movement of the stack.

2. In the manufacture of piston rings, or the like, a pair of coaxially aligned supports, each support having a bore therein adapted slidably to receive a plurality of piston rings in stacked relation face to face in the bore, whereby each ring is held properly positioned normal to an axis of operation by tight contact of its opposed faces with neighboring rings in the stack and is held against displacement radially by contact with the bore, said supports having adjoining ends spaced less than the width of any individual ring in the plurality of rings to insure smooth transfer from one support to the other, the spacing of said supports also exposing the outer peripheries of the rings, means for moving the stack axially at a feed rate through the bores past a tool station at the aforesaid space between the supports, and tool means at the tool station for machining one of the peripheries of the rings in the movement of the stack.

3. In the manufacture of piston rings, or the like, a pair of coaxially aligned supports, each support having a bore therein adapted slidably to receive a plurality of piston rings in stacked relation face to face in the bore, whereby each ring is held properly positioned normal to an axis of operation by tight contact of its opposed faces with neighboring rings in the stack and is held against displacement radially by contact with the bore, said supports having adjoining ends spaced less than the width of a ring and enough to permit machining the peripheries of the rings in the bores, means for moving the stack axially at a feed rate through the bores past a tool station at the aforesaid space between the supports, and tool means at the tool station for machining the outer peripheries of the rings in the movement of the stack.

4. In the manufacture of split piston rings, or the like, a plurality of coaxially aligned supports, each support having a bore therein adapted slidably to receive a plurality of piston rings in stacked relation face to face in the bore, whereby each ring is held properly positioned normal to an axis of operation by tight contact of its opposed faces with neighboring rings in the stack and is held against displacement radially by contact with the bore, said supports having adjoining ends spaced less than the width of a ring and enough to permit machining the peripheries of the rings in the bores, means for moving the stack axially at a feed rate through the bores past at least one tool station at the aforesaid space between supports, guide means in the bores slidably engaged in the gaps of the rings to hold the rings against turning when they are being machined, and tools at said station for machining the outer peripheries of said rings in the movement of the stack.

5. In a machine of the class described, the combination of a hollow cylindrical stationary support adapted for slidably supporting a stack of piston rings or the like in the bore thereof, a sizing ring in the outgoing end portion of the bore having a taper in the bore thereof on the incoming side in which rings are closed gradually to a predetermined outside diameter while being moved through the sizing ring, means for moving the stack of rings at a feed rate axially through said support and sizing ring, rotary turning means supported in concentric relation to said sizing ring and arranged to operate on the exposed portion of the periphery of the rings in their passage out of the sizing ring, and means for guiding the rings by the machined portion of their outer peripheries to help keep the same centered relative to the sizing ring while they are being machined on their outer peripheries.

6. The method of making piston rings which consists in placing a series of split rings as a cylindrical stack in a bore so that each of said rings is held positioned normal to an axis of operation by tight contact of its opposed faces with neighboring rings in the stack and is held against displacement radially by contact with the bore, exposing at a station in an intermediate portion of the travel of the rings in the bore a portion of the outer periphery of a ring in the bore circumferentially at said station for machining, supporting the remaining portion of such exposed ring in contact with the bore, and, while moving the stack axially in the bore past said station at a feed rate, machining the respective rings circumferentially on their outer peripheries at said station.

7. The method of making piston rings which consists in placing a series of split rings as a cylindrical stack in a bore so that each of said rings is held positioned normal to an axis of operation by tight contact of its opposed faces with neighboring rings in the stack and is held against displacement radially by contact with the bore, exposing at a station in an intermediate portion of the travel of the rings in the bore a portion of the outer periphery of a ring in the bore circumferentially at said station for machining, supporting the remaining portion of such exposed ring in contact with the bore and while moving the stack axially in the bore past said station at a feed rate, contracting the rings in succession to a predetermined outside diameter at said station, and, while still so contracted, machining the respective rings circumferentially on their outer peripheries at said station.

8. The method of making piston rings which consists in placing a series of split rings as a cylindrical stack in a bore so that each of said rings is held positioned normal to an axis of operation by tight contact of its opposed faces with neighboring rings in the stack and is held against displacement radially by contact with the bore, exposing enough of the outer peripheries of the rings in the bore circumferentially at a station for machining, and, while moving the stack axially in the bore past said station at a feed rate, expanding the rings in succession to a predetermined outside diameter at said station, and, while still so expanded, machining the same circumferentially on their outer peripheries.

9. The method of making piston rings which consists in placing a series of split rings as a cylindrical stack in a bore so that each of said rings is held positioned normal to an axis of operation by tight contact of its opposed faces with neighboring rings in the stack and is held against displacement radially by contact with the bore, and, while moving the stack axially in the bore at a feed rate past a station, expanding the rings in succession to a predetermined outside diameter at said station, and, while still so expanded, machining the same on their inner peripheries.

10. In a machine for machining resilient split work such as piston ring elements, the combination of a main external chuck, and an auxiliary external chuck aligned with the main chuck to receive work advanced thereto from the main chuck, the main chuck being internally rearwardly tapered to contract and grip resilient work, said main chuck and its throat being provided with an aligning rib engaging the split of the work, means for feeding a plurality of pieces of work disposed in side by side relation into said main chuck, and a cutter acting on the work as it is projected from the main chuck and delivered into said auxiliary chuck, the distance between said main and auxiliary chucks being such that a machined portion of the work is received within the auxiliary chuck prior to the complete discharge of work from the main chuck said auxiliary chuck having an internal aligning rib aligned with the aligning rib of said main chuck.

11. In a machine for machining resilient split work such as piston ring elements, the combination of a main external chuck, and an auxiliary external chuck aligned with the main chuck to receive work advanced thereto from the main chuck, the main chuck having a cylindrical work holding portion at its discharge end and an elongated throat having a rearwardly tapered portion for contracting work advanced through the throat, means for feeding a plurality of pieces of work disposed in side by side relation into said throat whereby they are contracted and frictionally supported as they are advanced into the main chuck, and a cutter acting on the work as it is projected from the main chuck and delivered into said auxiliary chuck, the auxiliary chuck being internally cylindrical at its front end and of an internal diameter corresponding to the diameter of the machined work, the distance between said main and auxiliary chucks being such that a machined portion of the work is received within the auxiliary chuck prior to the complete discharge of work from the main chuck.

12. The method of manufacturing piston rings comprising the steps of advancing a plurality of split resilient piston ring elements in side by side relation into a tapered chuck first acting to compress and frictionally hold the same, and delivering the ring elements from such first chuck to a second chuck aligned therewit, and externally machining the ring elements as they are successively discharged from the first chuck to the second chuck, the distance between the chucks being such that the work is received by the second chuck prior to its complete discharge from the first chuck.

13. In a machine of the class described, the combination of an external chuck adapted to contract and grip work advanced therethrough and having a cylindrical work holding portion at its discharge end, said chuck having an elongated throat provided with a rearwardly tapered portion for contracting work advanced therethrough, said chuck and its throat being provided with an aligning rib to engage the split of work such as split piston ring elements, means for advancing a plurality of pieces of work disposed in side by side relation into said throat whereby they are contracted and frictionally supported as they are advanced into the chuck, and a cutter disposed at the rear of the chuck to act on the outer circumference of a ring element at the rear of the chuck, said aligning rib engaging the split of the ring element acted upon by the cutter and spaced from said cutter to permit the cutter to cut the ring element without engaging the aligning rib.

14. A machine for machining split piston rings comprising an internally tapered main chuck adapted to contract work advanced therein, an auxiliary chuck adapted to receive work discharged from said main chuck, means for advancing a plurality of pieces of work in side by side relation in said main chuck, and a cutter operatively associated with said main and auxiliary chucks to act on the work as it is transferred from said main to said auxiliary chuck.

15. The method of manufacturing piston rings comprising the steps of advancing a plurality of split contractible piston ring elements in side by side relation into a tapered first chuck acting to compress and externally grip the elements, delivering the ring elements from such first chuck to a second chuck aligned therewith, and externally machining the ring elements as they are projected from the first chuck, the distance between the chucks being such that the work is received by the second chuck prior to its complete discharge from the first chuck.

ALBERT H. BATES.

REFERENCES CITED

The following references are of record in the file of this patent:

UNITED STATES PATENTS

| Number | Name | Date |
| --- | --- | --- |
| 185,159 | Bartlett | Dec. 12, 1876 |
| 893,239 | Gridley | July 14, 1908 |
| 913,312 | Sellew | Feb. 23, 1909 |
| 1,162,581 | Domizi | Nov. 30, 1915 |
| 1,219,440 | Clark | Mar. 20, 1917 |
| 1,296,580 | Woodvine | Mar. 4, 1919 |
| 1,311,937 | Williams | Aug. 5, 1919 |
| 1,386,997 | Elliott | Aug. 9, 1921 |
| 1,439,017 | Narsh | Dec. 19, 1922 |
| 1,454,349 | Teetor | May 8, 1923 |
| 1,487,411 | Wasson | Mar. 18, 1924 |
| 1,594,903 | Gray | Aug. 3, 1926 |
| 1,609,343 | Yates | Dec. 7, 1926 |
| 1,654,737 | Kistner | Jan. 3, 1928 |
| 1,668,790 | Teetor | May 8, 1928 |
| 1,772,082 | Hoern | Aug. 5, 1930 |
| 1,799,384 | Millspaugh | Apr. 7, 1931 |
| 1,888,792 | Cottrell | Nov. 22, 1932 |
| 1,906,389 | McFall | May 2, 1933 |
| 1,946,881 | Porter | Feb. 13, 1934 |
| 1,968,840 | Linn | Aug. 7, 1934 |
| 2,238,011 | Brouwer | Apr. 8, 1941 |
| 2,262,178 | Gest et al. | Nov. 11, 1941 |
| 2,270,548 | Olson | Jan. 20, 1942 |
| 2,311,998 | Pope | Feb. 23, 1943 |
| 2,373,344 | Scarff | Apr. 10, 1945 |
| 2,377,960 | Phillips | June 12, 1945 |

Certificate of Correction

Patent No. 2,566,304 — September 4, 1951

ALBERT H. BATES

It is hereby certified that error appears in the printed specification of the above numbered patent requiring correction as follows:

Column 7, line 39, for "space" read *spaces*; column 8, line 70, after "chuck" insert a comma; column 9, line 27, for "therewit" read *therewith*;

and that the said Letters Patent should be read as corrected above, so that the same may conform to the record of the case in the Patent Office.

Signed and sealed this 4th day of March, A. D. 1952.

[SEAL]

THOMAS F. MURPHY,
*Assistant Commissioner of Patents.*